(12) United States Patent
Park et al.

(10) Patent No.: US 11,297,207 B2
(45) Date of Patent: Apr. 5, 2022

(54) METHOD FOR OUTPUTTING COLOR IMAGE IN USER COLOR

(71) Applicant: Hewlett-Packard Development Company, L.P., Spring, TX (US)

(72) Inventors: In Ho Park, Seongnam-si (KR); Jae Min Shin, Seongnam-si (KR); Hyun Soo Oh, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 28 days.

(21) Appl. No.: 17/050,895

(22) PCT Filed: Dec. 17, 2018

(86) PCT No.: PCT/KR2018/015971
§ 371 (c)(1),
(2) Date: Oct. 27, 2020

(87) PCT Pub. No.: WO2020/045758
PCT Pub. Date: Mar. 5, 2020

(65) Prior Publication Data
US 2021/0234990 A1 Jul. 29, 2021

(30) Foreign Application Priority Data
Aug. 30, 2018 (KR) .......................... 10-2018-0102882

(51) Int. Cl.
*H04N 1/60* (2006.01)
*G06K 15/02* (2006.01)
*H04N 1/00* (2006.01)

(52) U.S. Cl.
CPC ......... *H04N 1/603* (2013.01); *G06K 15/1878* (2013.01); *H04N 1/00018* (2013.01); *H04N 1/6027* (2013.01)

(58) Field of Classification Search
CPC .. H04N 1/603; H04N 1/00018; H04N 1/6027; G06K 15/1878
See application file for complete search history.

(56) References Cited

U.S. PATENT DOCUMENTS 8,964,221 B2 * 2/2015 Sato ................... G03G 15/5062
358/1.15
9,531,906 B2 12/2016 Martin et al.
(Continued)

FOREIGN PATENT DOCUMENTS

CN 102572210 A 7/2012
CN 103873724 A 6/2014
(Continued)

*Primary Examiner* — Quang N Vo
(74) *Attorney, Agent, or Firm* — Jefferson IP Law, LLP

(57) ABSTRACT

A method performed by an image forming apparatus is provided. The method includes receiving an input of selecting a first color from a first color image, scanning, a reference image including at least one reference color that is used to reproduce a color, receiving an input of selecting a second color from the at least one reference color, based on scan color data in which characteristics of the image forming apparatus obtained by scanning a color compensation chart representing a color space have been reflected, determining a second color scan value of the second color as a second color value of the second color from which the characteristics of the image forming apparatus have been removed, and converting a first color value of the first color into the second color value of the second color and outputting the first color image having the second color instead of the first color.

15 Claims, 10 Drawing Sheets

(56) References Cited

U.S. PATENT DOCUMENTS

| | | |
|---|---|---|
| 2006/0001665 A1 | 1/2006 | Kupersmit |
| 2007/0109564 A1 | 5/2007 | Nakane |
| 2015/0365564 A1* | 12/2015 | Imaseki ............... H04N 1/6019 |
| | | 358/504 |
| 2016/0191750 A1 | 6/2016 | Chung et al. |
| 2016/0261775 A1 | 9/2016 | Jung et al. |
| 2017/0310854 A1 | 10/2017 | Yamaguchi |
| 2017/0359489 A1 | 12/2017 | Lopez |
| 2018/0013926 A1 | 1/2018 | Yamaguchi |

FOREIGN PATENT DOCUMENTS

| | | |
|---|---|---|
| CN | 105187687 A | 12/2015 |
| JP | 2014-131126 A | 7/2014 |
| JP | 2017-157971 A | 9/2017 |
| KR | 10-2018-0041918 A | 4/2018 |

\* cited by examiner

[Fig. 1]
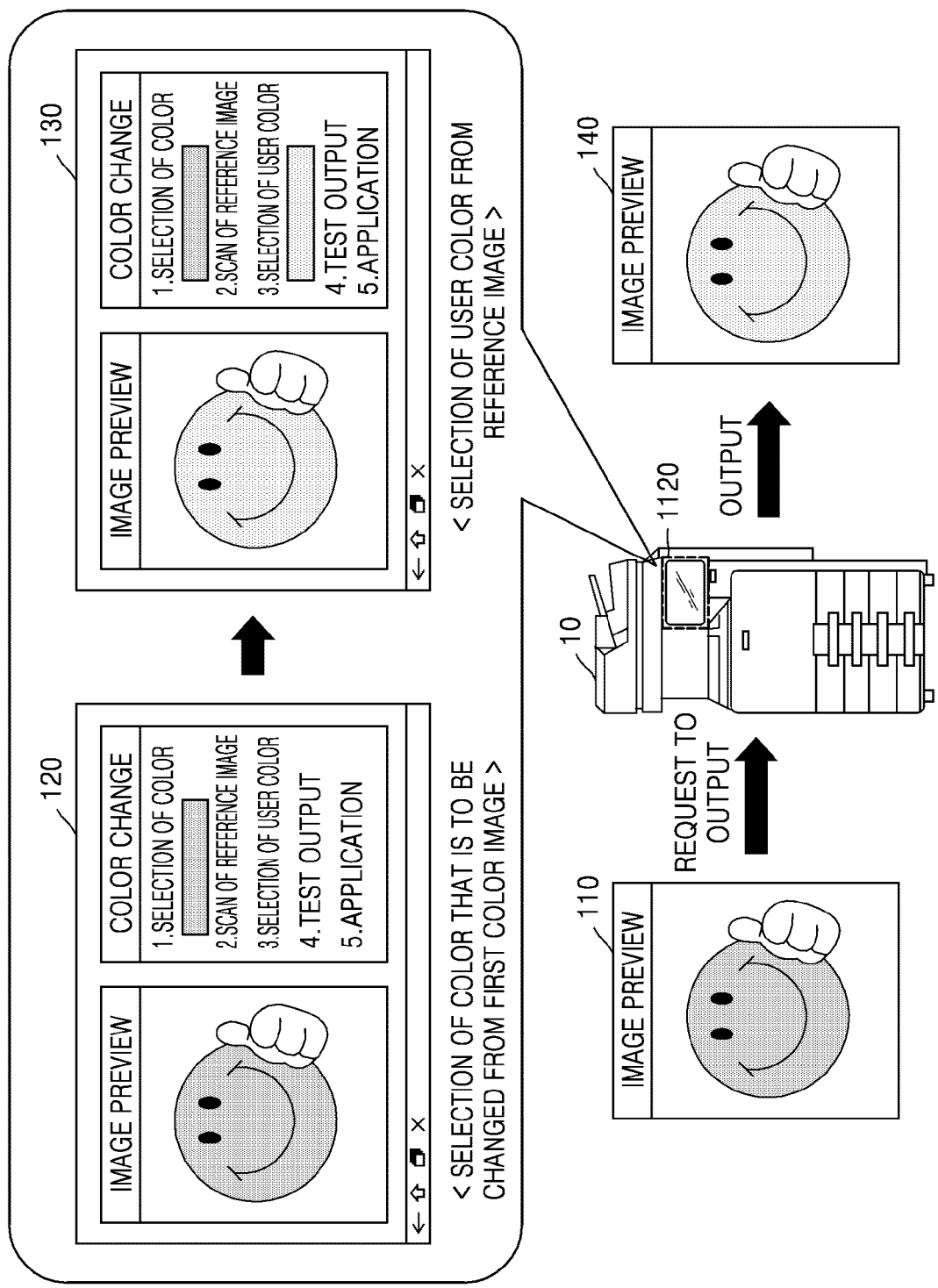

[Fig. 2]
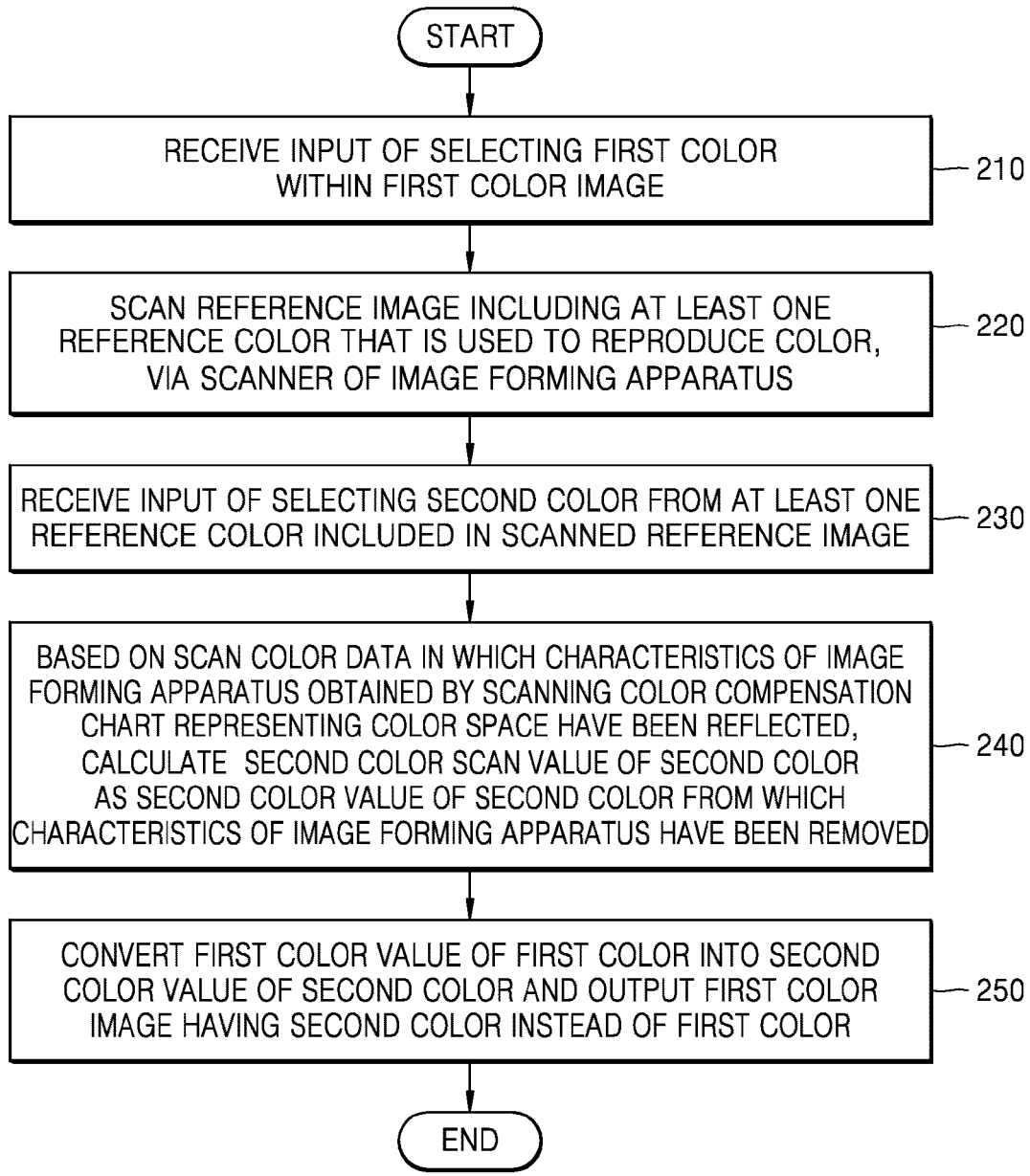

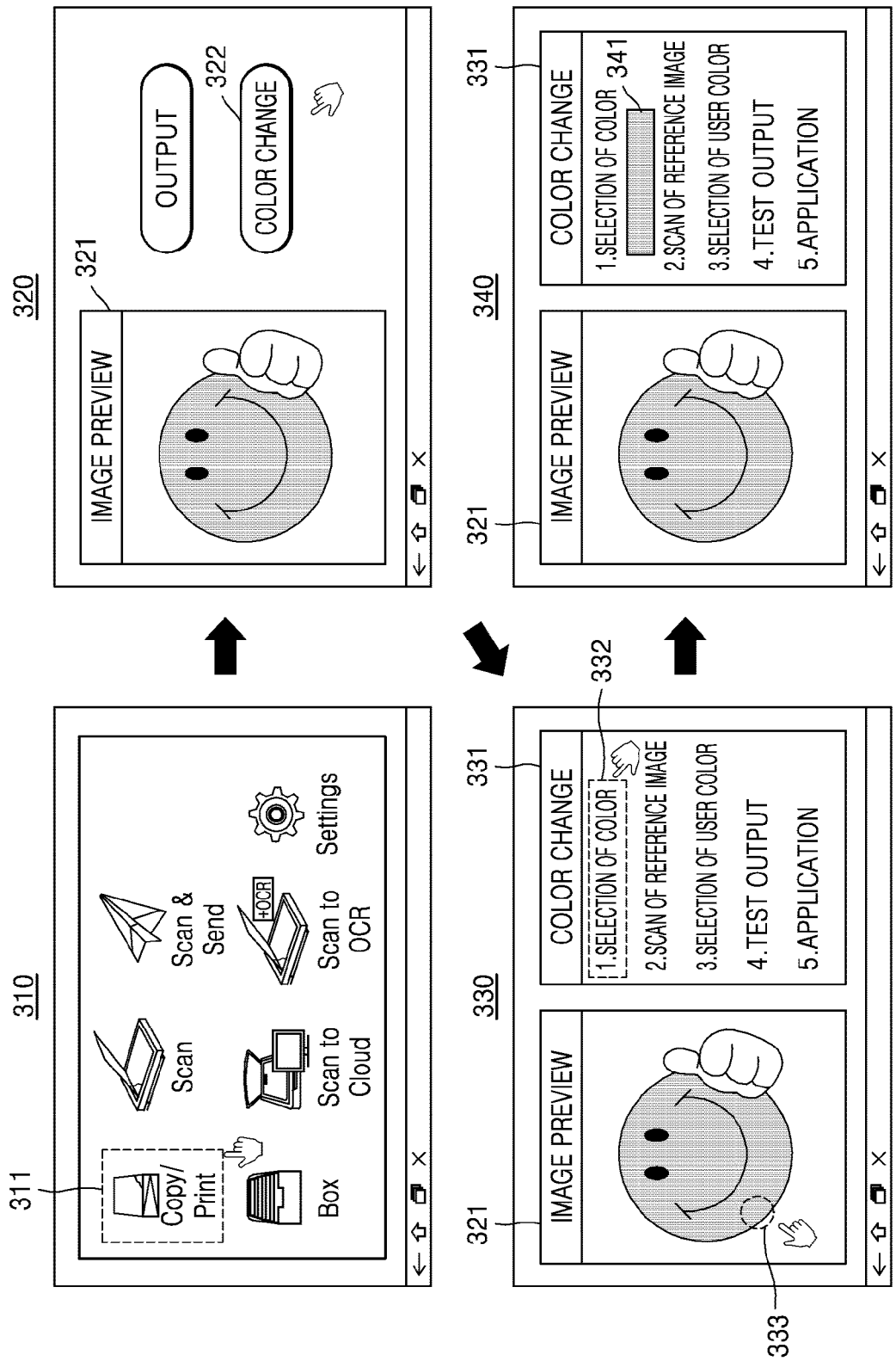

[Fig. 4]
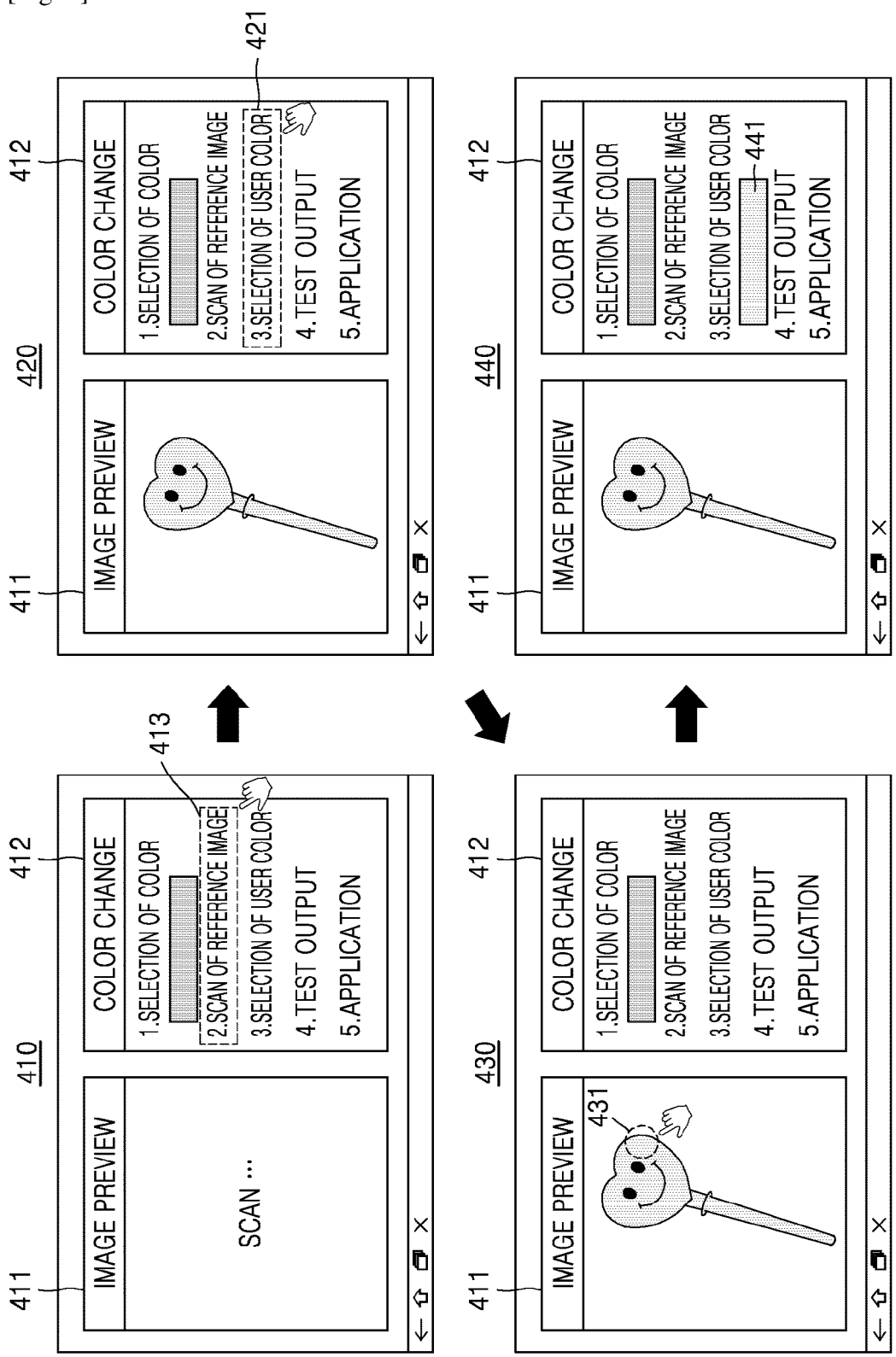

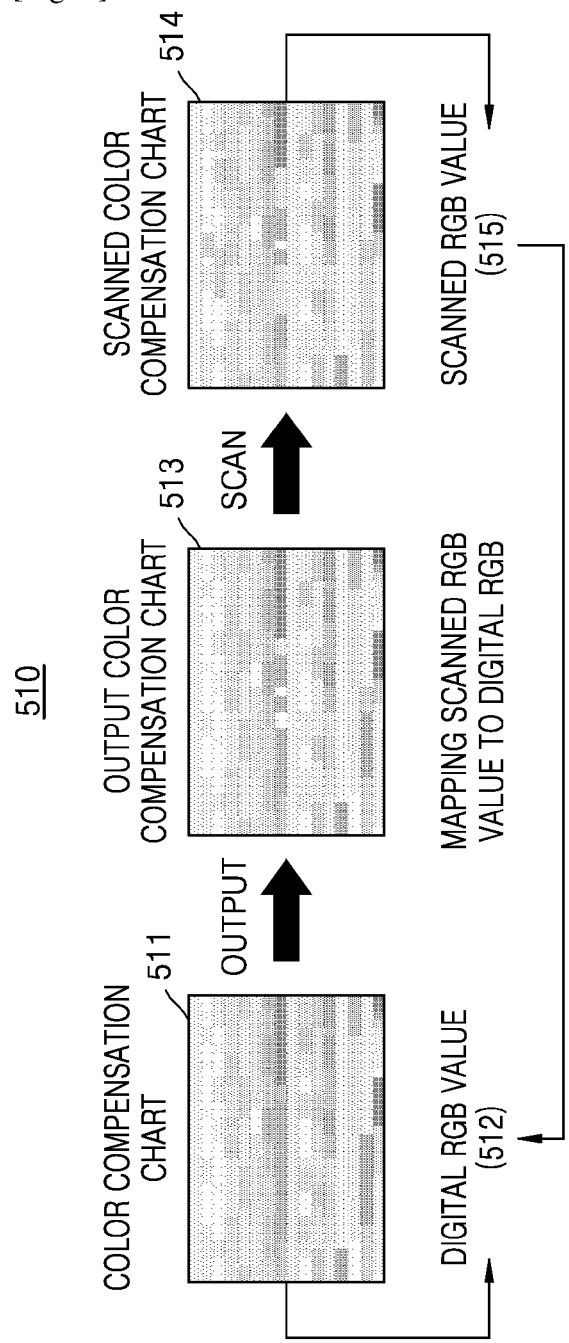

[Fig. 6]
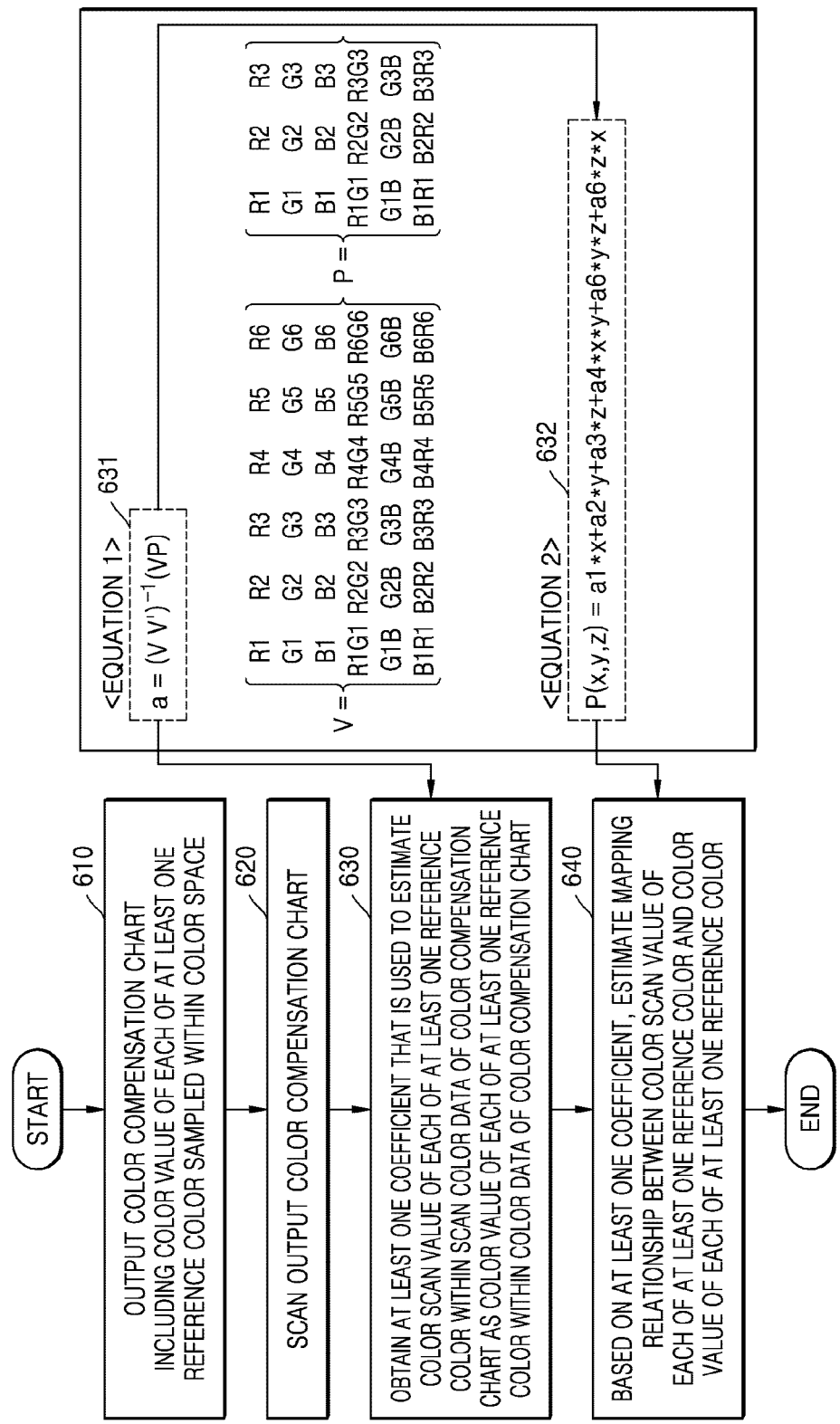

[Fig. 7]
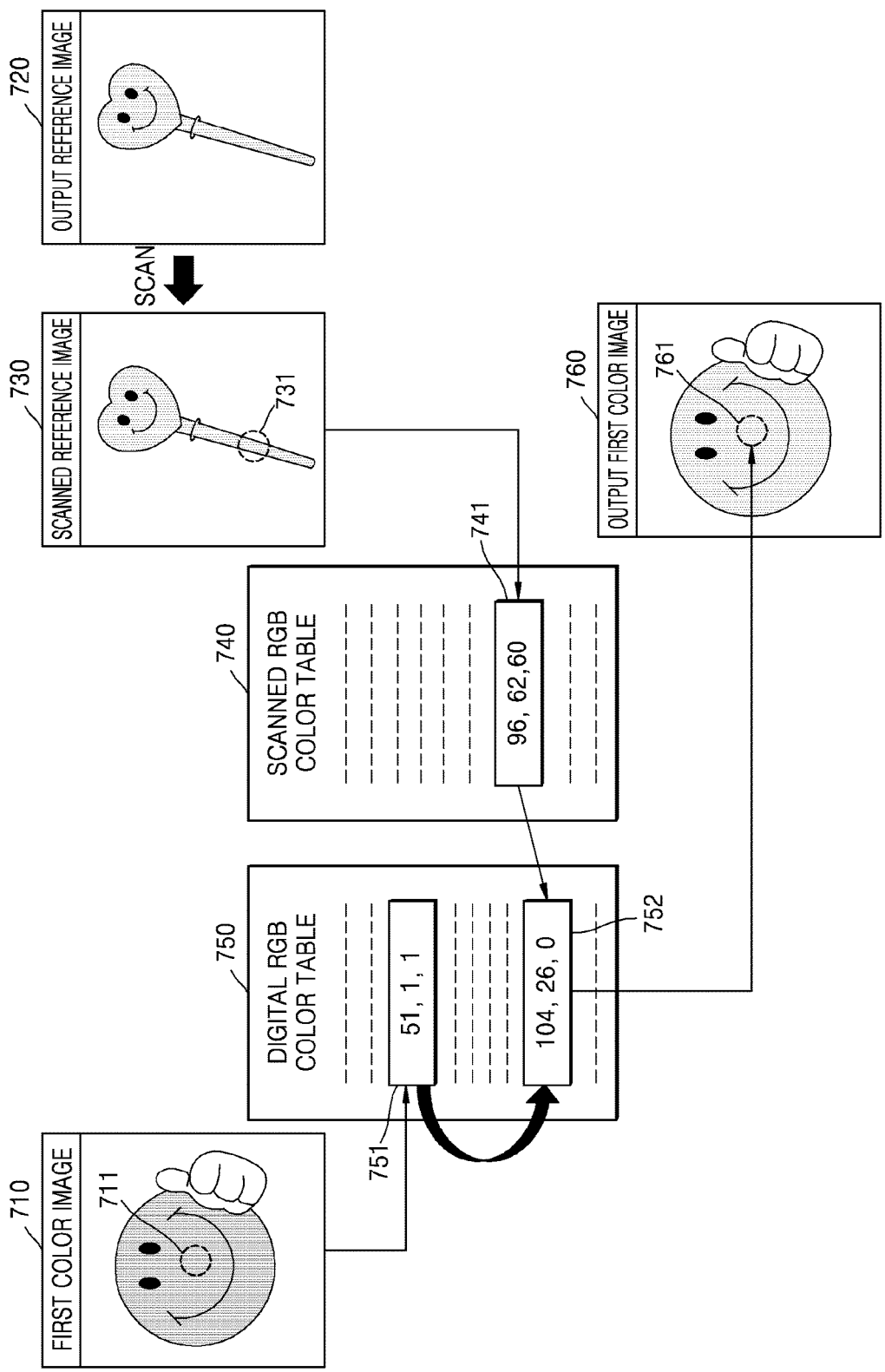

[Fig. 8]
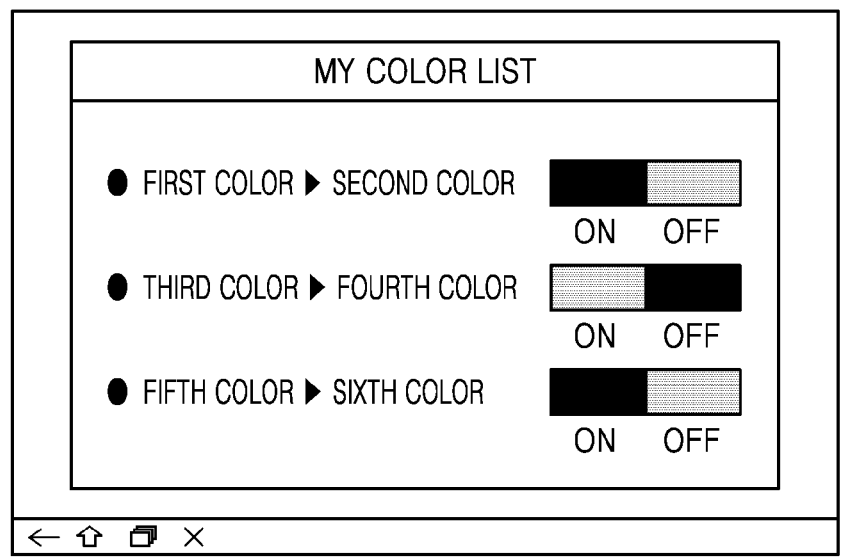
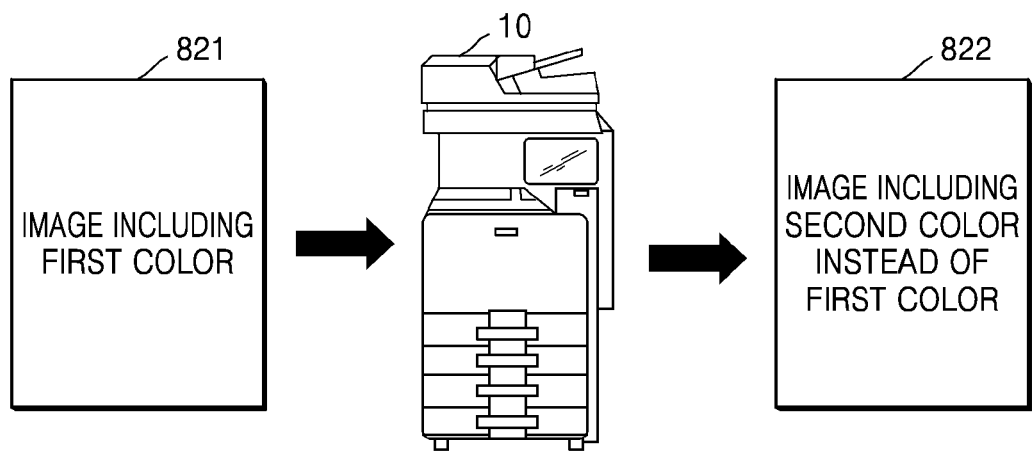

[Fig. 9]
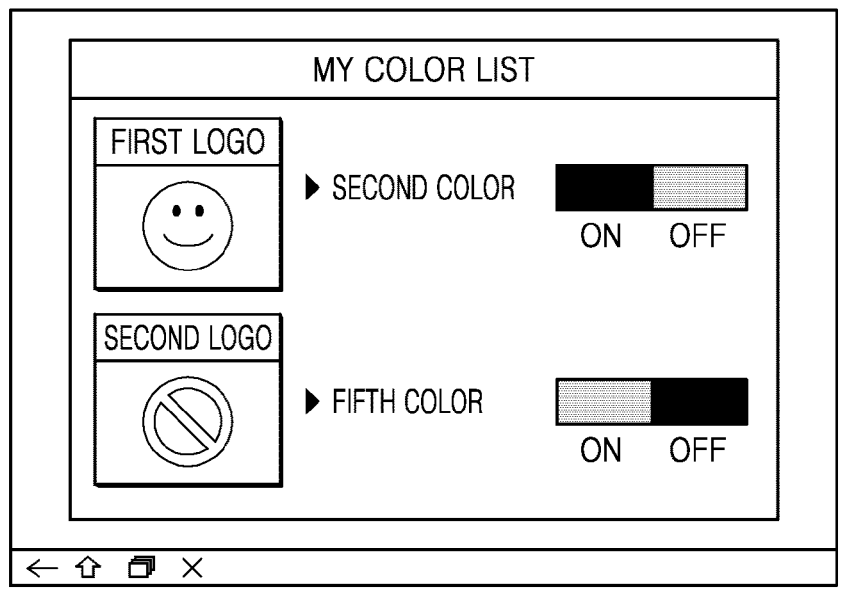
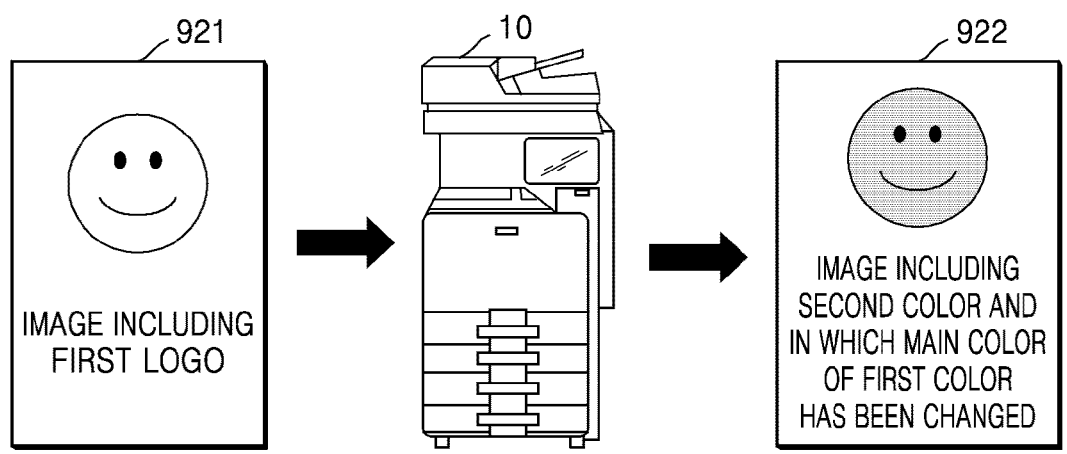

[Fig. 10]
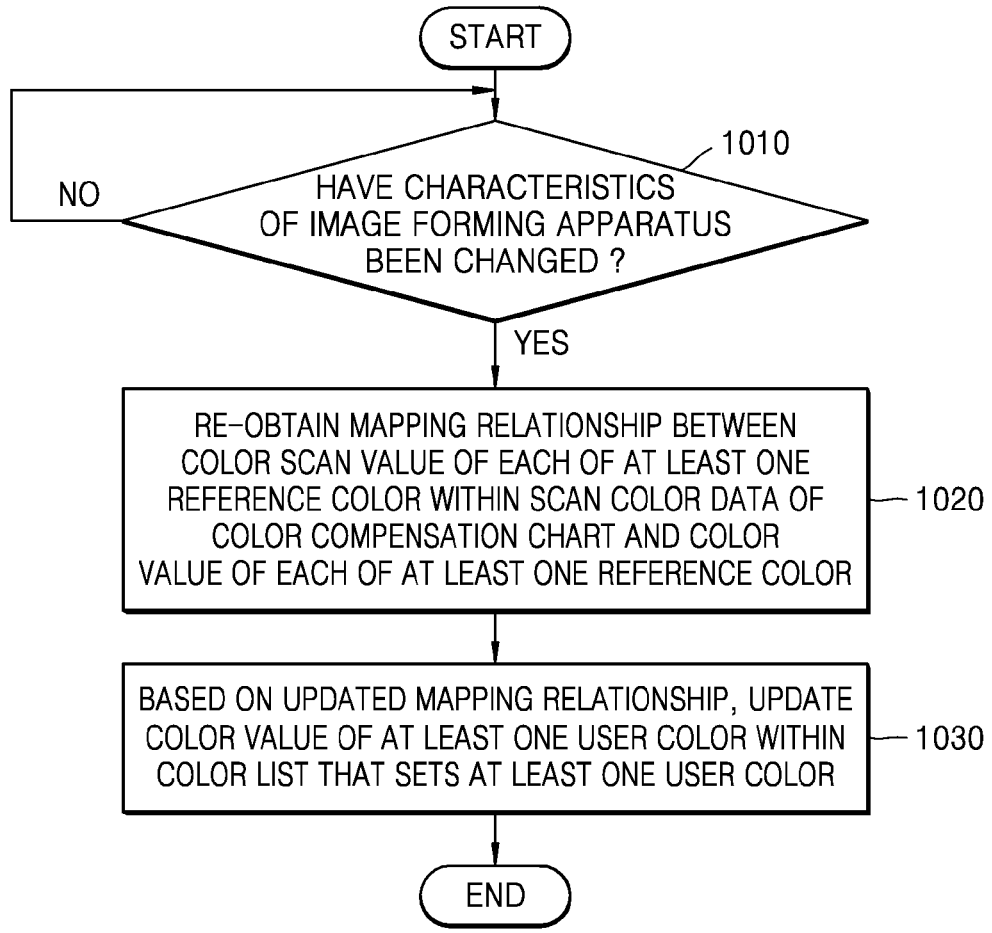
[Fig. 11]
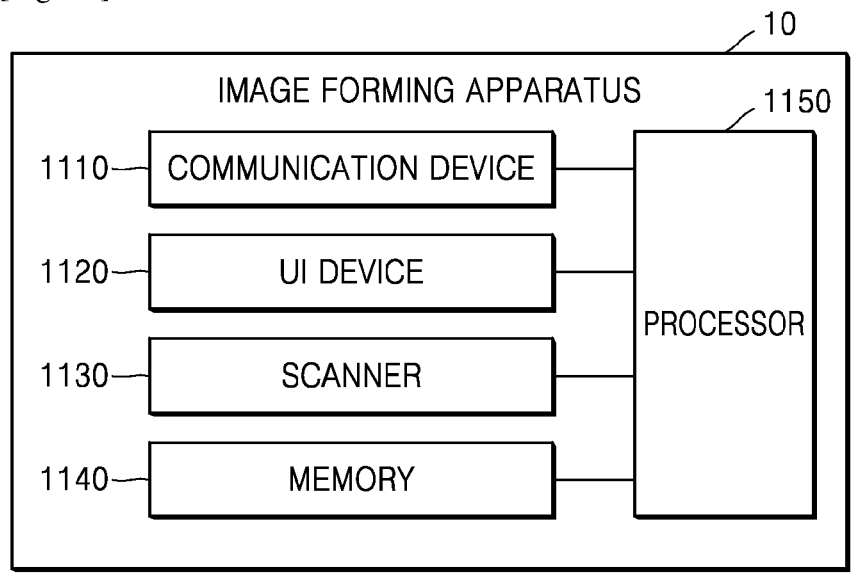

METHOD FOR OUTPUTTING COLOR IMAGE IN USER COLOR

BACKGROUND ART

An image forming apparatus may output, in color, printed matter via an image forming operation. An image forming apparatus may receive a user input of adjusting color components, such as brightness, saturation, hue, and the like. An image forming apparatus may output printed matter according to the adjusted color components.

BRIEF DESCRIPTION OF DRAWINGS

This disclosure may be readily understood by reference to the following description and the accompanying drawings, in which:

FIG. 1 is a conceptual view for explaining an operation by which an image forming apparatus changes a certain color within a certain color image to a color desired by a user and outputs a color image having the color desired by the user, according to an example;

FIG. 2 is a flowchart of an image forming apparatus operation, according to an example;

FIG. 3 is a conceptual view for explaining a process of selecting a color that is to be changed within a first color image, via a user interface (UI) device of an image forming apparatus, according to an example;

FIG. 4 is a conceptual view for explaining a process of selecting a user color from a reference image via a UI device of an image forming apparatus, according to an example;

FIG. 5 is a schematic diagram for explaining a process in which an image forming apparatus obtains a mapping relationship between a scan color value of a color compensation chart representing a color space and a color value of the color compensation chart, according to an example;

FIG. 6 is a flowchart of a method, performed by an image forming apparatus, of obtaining a mapping relationship between a scan color value of a color compensation chart and a color value of the color compensation chart, according to an example;

FIG. 7 is a conceptual view for explaining a process in which an image forming apparatus changes a certain color within a first digital image to a color desired by a user and outputs a first digital image including the changed color, according to an example;

FIG. 8 is a conceptual view for explaining a process in which an image forming apparatus registers a color desired by a user in a color list and operates based on the color list, according to an example;

FIG. 9 is a conceptual view for explaining a process in which an image forming apparatus maps a certain logo to a color of the certain logo, registers a result of the mapping in a color list, and operates based on the color list, according to an example;

FIG. 10 is a flowchart of a method, performed by an image forming apparatus when characteristics thereof have been changed, of re-obtaining a mapping relationship between a scan color domain of a color compensation chart and a color domain of the color compensation chart and updating a color list, according to an example; and FIG. 11 is a block diagram of an image forming apparatus, according to an example.

Throughout the drawings, it should be noted that like reference numbers are used to depict the same or similar elements, features, parts, components, and structures.

MODE FOR THE INVENTION

An image forming apparatus used herein may be any type of apparatus capable of performing an image forming operation, such as a printer, a copier, a scanner, a fax machine, a multi-function printer (MFP), or a display apparatus. Print data, as used herein, may refer to data transformed into a format capable of being printed by a printer. A scan file, as used herein, may refer to a file obtained by scanning an image in a scanner.

Examples are described herein with reference to the accompanying drawings so that this disclosure may be easily performed by one of ordinary skill in the art to which the disclosure pertains. The disclosure may, however, be embodied in many different forms and should not be construed as being limited to the examples set forth herein.

FIG. 1 is a conceptual view for explaining an operation by which an image forming apparatus changes a certain color within a certain color image to a color desired by a user and outputs a color image having the color desired by the user, according to an example.

Referring to FIG. 1, an image forming apparatus 10 may receive a request for outputting a first color image 110. Referring to an image 120, a user interface (UI) device 1120 of the image forming apparatus 10 may receive a request to change a certain color within the first color image 110 to another color and output a first color image having the changed color. The UI device 1120 of the image forming apparatus 10 may receive an input of selecting a first color that is to be changed from the first color image 110.

Referring to an image 130, the UI device 1120 of the image forming apparatus 10 may receive an input of selecting a user color representing a second color desired by a user from a reference image. The image forming apparatus 10 may change the first color within the first color image 110 to the second color to output a first color image 140 having the changed color.

FIG. 2 is a flowchart of an image forming apparatus operation, according to an example.

Referring to FIG. 2, the image forming apparatus 10 may receive an input of selecting a first color within the first color image 110 in operation 210. An example process in which the image forming apparatus 10 receives an input of selecting a first color within a first color image will be described with reference to FIG. 3.

In operation 220, the image forming apparatus 10 may scan a reference image including at least one reference color that is used to reproduce a color, via a scanner of the image forming apparatus 10. The reference image may include regions output in reference colors, and each reference color may include a user color that is a color desired by a user and used to display a certain image.

In operation 230, the image forming apparatus 10 may receive an input of selecting a second color from the at least one reference color included in the scanned reference image. An example process in which the image forming apparatus 10 receives the reference image and selects a second color from reference colors included in the scanned reference image will be described with reference to FIG. 4.

In operation 240, based on scan color data in which characteristics of the image forming apparatus 10 obtained by scanning a color compensation chart representing a color space have been reflected, the image forming apparatus 10 may determine a second color scan value of the second color as a second color value of the second color from which the characteristics of the image forming apparatus 10 have been removed.

The color compensation chart may include a color value of each of at least one reference color sampled within the color space. The reference color may be a representative color sampled to represent the color space. For example, the reference color may be respective colors of red (R), green (G), and blue (B) sampled within the color space.

The characteristics of the image forming apparatus 10 may be determined by at least one of a manufacturing company of the image forming apparatus 10, at least one component that is used according to a certain operation in the image forming apparatus 10, and toner that is used in the image forming apparatus 10. A description of an example thereof will be given with reference to FIG. 5.

The image forming apparatus 10 may determine the second color scan value as the second color value, based on a mapping relationship between a color scan value of each of the at least one reference color within the scan color data of the color compensation chart and a color value of each of the at least one reference color within color data of the color compensation chart.

The image forming apparatus 10 may obtain the mapping relationship between the color scan value of each of the at least one reference color within the scan color data of the color compensation chart and the color value of each of the at least one reference color, based on the scan color data of the color compensation chart.

For example, the image forming apparatus 10 may output a color compensation chart including a color value of each of at least one reference color sampled within a color space. The image forming apparatus 10 may scan the output color compensation chart via the scanner. The image forming apparatus 10 may obtain at least one coefficient that is used to estimate the color scan value of each of the at least one reference color within the scan color data of the color compensation chart as the color value of each of the at least one reference color within the color data of the color compensation chart. Based on the at least one coefficient, the image forming apparatus 10 may estimate the mapping relationship between the color scan value of each of the at least one reference color and the color value of each of the at least one reference color. An example process of estimating the mapping relationship between the color scan value of each reference color and the color value of each reference color will be described with reference to FIG. 6.

The image forming apparatus 10 may obtain a mapping relationship between a color scan value of each of at least one reference color having a color value belonging to a preset range from the second color value of the second color and a color value of each of the at least one reference color. By using color values belonging to the preset range from the second color value, the image forming apparatus 10 may more accurately map the second color scan value corresponding to the second color to the second color value corresponding to the second color.

In operation 250, the image forming apparatus 10 may convert a first color value of the first color into the second color value of the second color and thus output the first color image having the second color instead of the first color. An example process of changing a first color within a first color image to a second color and outputting a first color image having the second color will be described with reference to FIG. 7.

The image forming apparatus 10 may register the second color as a replacement for the first color in a color list setting at least one user color. Based on a user input, the image forming apparatus 10 may set whether to activate a color changing operation to change the first color to the second color. The image forming apparatus 10 may output a certain image for which the image forming apparatus 10 is requested, according to whether the color changing operation is activated.

The image forming apparatus 10 may receive a request to output a third color image. When the color changing operation to change the first color to the second color has been activated, the image forming apparatus 10 may determine whether the first color exists within the third color image. When the first color exists within the third color image, the image forming apparatus 10 may change the first color to the second color to output a third color image having the second color. An example process of changing the first color within the third color image to the second color and outputting a third color image having the second color will be described with reference to FIG. 8.

The image forming apparatus 10 may map the shape of a first logo to the color of the first logo and register a result of the mapping in the color list setting at least one user color. The image forming apparatus 10 may receive a request to output a third color image. The image forming apparatus 10 may determine whether the third color image includes a first shape that is the same as the shape of the first logo. When the third color image includes the first shape that is the same as the shape of the first logo, the image forming apparatus 10 may apply the color of the first logo to the first shape included in the third color image and may output a third color image. An example process of applying the color of a first logo included in a third color image to the shape of the first logo and outputting a third color image will be described with reference to FIG. 9.

When a first component that is used in a certain image forming operation is replaced within the image forming apparatus 10, the image forming apparatus 10 may re-obtain the mapping relationship between the color scan value of each of the at least one reference color within the scan color data of the color compensation chart and the color value of each of the at least one reference color, and may update the mapping relationship. Based on the updated mapping relationship, the image forming apparatus 10 may update the color value of the at least one user color within the color list that sets the at least one user color. An example process of updating the mapping relationship that correlates the color scan value of each of the at least one reference color to the color value of each of the at least one reference color will be described with reference to FIG. 10.

The image forming apparatus 10 may scan an image including a user color via the scanner of the image forming apparatus 10, and may obtain a color value from which a color change due to the characteristics of the image forming apparatus 10 has been removed, from a color scan value corresponding to the user color within the scanned image. The image forming apparatus 10 may change a certain color within a certain image to a user color and may output a certain color including the user color.

A user may obtain a certain color image output in his or her desired color, by selecting his or her desired color on the UI device 1120 of the image forming apparatus 10 even when having no knowledge of colors. The image forming apparatus 10 may change a certain color within a certain image to a user color and may output a certain image including the user color, without mounting expensive equipment or applications in order to more precisely reproduce a color desired by the user.

FIG. 3 is a conceptual view for explaining a process of selecting a color that is to be changed within a first color image, via a UI device of an image forming apparatus, according to an example.

Referring to FIG. 3, the UI device 1120 of the image forming apparatus 10 may display icons of applications corresponding to services that are provided by the image forming apparatus 10 as illustrated in an image 310. For example, the applications may include an application that provides a copying/printing service, an application that provides a scan service, an application that provides a service of transmitting a file after a scan operation, an application that provides a service of storing a file obtained by the image forming apparatus 10, an application that provides a service of storing a file in a cloud after a scan operation, an application of providing an optical character recognition (OCR) service after a scan operation, and an application that provides environment settings of the image forming apparatus 10. The UI device 1120 may receive an input of selecting an icon of an application 311 that provides a copying/printing service.

Referring to an image 320, the UI device 1120 may display an image preview 321 for a first color image that a user is to copy or print. The UI device 1120 may display an output icon for controlling the first color image displayed on the image preview 321 to be output without changes, and a color change icon 322 for controlling a color within the first color image to be changed and a first color image to be output in the changed color. The UI device 1120 may receive an input of selecting the color change icon 322.

Referring to an image 330, the UI device 1120 may display a screen image 331 including information about a color change. The UI device 1120 may receive an input of selecting a "color selection" item 332 from among the information. The UI device 1120 may receive an input 333 of selecting a first color from a first color image via the image preview 321. The first color represents a color that is to be changed within the first color image.

Referring to an image 340, the UI device 1120 may display information 341 representing the first color selected from the screen image 331 via the image preview 321.

FIG. 4 is a conceptual view for explaining a process of selecting a user color from a reference image via a UI device of an image forming apparatus, according to an example.

Referring to FIG. 4, the UI device 1120 of the image forming apparatus 10 may receive an input of selecting a "reference image scan" item 413 from among information about a color change via a screen image 412 as illustrated in an image 410. A reference image may be an image including at least one reference color that is used to reproduce a color. The UI device 1120 may scan a reference image via the scanner of the image forming apparatus 10. The UI device 1120 may display information representing progress of a scan operation on an image preview 411.

Referring to an image 420, when a scan operation is completed, the UI device 1120 may display the scanned reference image on the image preview 411. The UI device 1120 may receive an input of selecting a "user color selection" item 421 from among the information about the color change via the screen image 412. A user color may be a color registered as a color of interest or a customized color of the user in a color list. The user color may be a color that may be used to replace a certain color as necessary.

Referring to an image 430, the UI device 1120 may receive an input 431 of selecting a second color from the reference image via the image preview 411. The second color is a user color selected from reference colors included in the reference image.

Referring to an image 440, the UI device 1120 may display information 441 representing the second color selected from the screen image 412 via the image preview 411.

FIG. 5 is a schematic diagram for explaining a process in which an image forming apparatus obtains a mapping relationship between a scan color value of a color compensation chart representing a color space and a color value of the color compensation chart, according to an example.

Referring to FIG. 5, the image forming apparatus 10 may obtain characteristics of the image forming apparatus 10 by using a device calibration function. For example, the characteristics of the image forming apparatus 10 may be determined by at least one of a manufacturing company of the image forming apparatus 10, at least one component that is used according to a certain operation in the image forming apparatus 10, and toner that is used in the image forming apparatus 10. For example, when the image forming apparatus 10 performs a printing operation with respect to the first color image, saturation, brightness, hue, and the like of at least one color from among colors within the first color image may be represented differently according to the types of toner used in the image forming apparatus 10, even when the same color is represented.

In other words, a color output value of a first color image output by the image forming apparatus 10 or a color scan value of a first color image scanned by the image forming apparatus 10 may be different from the color value of the first color image. The color output value of the first color image output by the image forming apparatus 10 or the color scan value of the first color image scanned by the image forming apparatus 10 may include an error with respect to the color value of the first color image generated due to the characteristics of the image forming apparatus 10.

The image forming apparatus 10 may obtain a mapping relationship between a color scan value within a scan color domain of a color compensation chart representing a color space and a color value within a color domain of the color compensation chart.

Referring to an image 510, the image forming apparatus 10 may obtain a color compensation chart 511 including the color value of each of at least one reference color sampled within the color space. The image forming apparatus 10 may store the obtained color compensation chart 511. The reference color may be a representative color sampled to represent the color space. For example, the reference color may be respective colors of R, G, and B sampled within the color space. The image forming apparatus 10 may obtain a digital RGB value 512 of each of the at least one reference color from the color compensation chart 511.

The image forming apparatus 10 may output the color compensation chart 511 and obtain an output color compensation chart 513 output as an image. A color output value of the output color compensation chart 513 may be different from a color value of the color compensation chart 511 due to a printing operation of the image forming apparatus 10. In other words, the output color compensation chart 513 may be a color compensation chart output after characteristics of a printer are reflected in the color compensation chart 511.

The image forming apparatus 10 may scan the output color compensation chart 513 to obtain a scanned color compensation chart 514. The image forming apparatus 10 may store the scanned color compensation chart 514. For example, the image forming apparatus 10 may store color scan data within the scanned color compensation chart 514, in a look-up table according to respective components of colors.

A color output value of the scanned color compensation chart 514 may be different from the color output value of the output color compensation chart 513 or the color value of the color compensation chart 511 due to a scan operation of the image forming apparatus 10. In other words, the scanned color compensation chart 514 may be a color compensation chart scanned after characteristics of a scanner are reflected in the output color compensation chart 513. The image forming apparatus 10 may obtain a scanned RGB value 515 of each of the at least one reference color from the scanned color compensation chart 514.

The image forming apparatus 10 may obtain at least one coefficient that is used to estimate the scanned RGB value 515 of each of the at least one reference color within the scan color data of the scanned color compensation chart 514 as the digital RGB value 512 of each of the at least one reference color within the color data of the color compensation chart 511.

Based on the at least one coefficient, the image forming apparatus 10 may estimate the mapping relationship between the scanned RGB value 515 of each of the at least one reference color and the digital RGB value 512 of each of the at least one reference color. An example of obtaining a mapping relationship will be described with reference to FIG. 6.

FIG. 6 is a flowchart of a method, performed by an image forming apparatus, of obtaining a mapping relationship between a scan color value of a color compensation chart and a color value of the color compensation chart, according to an example.

Referring to FIG. 6, the image forming apparatus 10 may output a color compensation chart including the color value of each of at least one reference color sampled within a color space in operation 610.

For example, respective color values of R, G, and B in an RGB color value may each range from 0 to 255. Accordingly, the color space may be expressed in colors having 16,777,216 values, based on the possible combinations of R, G, and B or 256$^3$. The color compensation chart may be formed by sampling the RGB color value within the color space. For example, the color compensation chart may be expressed in colors having 729 values, based on the possible combinations of 9 color values of R, 9 color values of G, and 9 color values of B or 9$^3$. The image forming apparatus 10 may output a color compensation chart representing a color space which is a combination of the 9 color values of R, the 9 color values of G, and the 9 color values of B. The output color compensation chart may be different from a not-yet-output color compensation chart due to the printer characteristics of the image forming apparatus 10. In other words, a value corresponding to a first color value within the output color compensation chart may be different from a value corresponding to a first color value within the color compensation chart.

In operation 620, the image forming apparatus 10 may scan the output color compensation chart via the scanner of the image forming apparatus 10.

The scanned color compensation chart may be different from the output color compensation chart due to the scanner characteristics of the image forming apparatus 10. In other words, a value corresponding to a first color value within the scanned color compensation chart (for example, a first color scan value) may be different from the value corresponding to the first color value within the output color compensation chart (for example, a first color output value).

The scanned color compensation chart may be different from the color compensation chart due to the printer characteristics and the scanner characteristics of the image forming apparatus 10. In other words, the value corresponding to the first color value within the scanned color compensation chart (for example, the first color scan value) may be different from the value corresponding to the first color value within the color compensation chart.

In operation 630, the image forming apparatus 10 may obtain at least one coefficient that is used to estimate the color scan value of each of the at least one reference color within the scan color data of the color compensation chart as the color value of each of the at least one reference color within the color data of the color compensation chart. For example, the image forming apparatus 10 may obtain at least one coefficient that is used to estimate the color scan value of each reference color as the color value of each reference color, via regression analysis.

For example, the image forming apparatus 10 may obtain at least one coefficient that is used to estimate a digital RGB value from a scanned RGB value, by using a matrix representing the scanned RGB value and a matrix representing the digital RGB value. According to Equation 1 (631), the image forming apparatus 10 may obtain coefficients a1 through a6 that are used to estimate the digital RGB value from the scanned RGB value. Referring to FIG. 6, V indicated in Equation 1 refers to the matrix indicating the digital RGB value and P refers to the matrix indicating the scanned RGB value. The scanned RGB value may be an RGB value sampled within the scan color data. When the sampled RGB value is a surrounding value of the scanned RGB value corresponding to a certain color value, the coefficients a1 through a6 may be more accurately obtained.

In operation 640, based on the at least one coefficient, the image forming apparatus 10 may estimate the mapping relationship between the color scan value of each of the at least one reference color and the color value of each of the at least one reference color.

For example, according to Equation 2 (632), the image forming apparatus 10 may estimate the mapping relationship between the color scan value and the color value by confirming that the digital RGB value is obtained using the coefficients obtained via Equation 1 (631) and the scanned RGB value.

When the image forming apparatus 10 substitutes the coefficients obtained via Equation 1 (631) and a color scan value of a certain color into Equation 2 (632), the image forming apparatus 10 may obtain a color value of the certain color. In this case, the color value of the certain color may be a value from which an error that may be generated due to the printer characteristics and the scanner characteristics of the image forming apparatus 10 has been removed. An example process of changing a certain color within a certain color image to a color desired by a user and outputting a certain color image including the color desired by the user will be described with reference to FIG. 7.

FIG. 7 is a conceptual view for explaining a process in which an image forming apparatus changes a certain color within a first digital image to a color desired by a user and outputs a first digital image including the changed color, according to an example.

Referring to FIG. 7, the image forming apparatus 10 may receive a request for changing a first color 711 within a first color image 710 to a second color 731 within a reference image and outputting a first color image having the second color 731. The image forming apparatus 10 may receive an input of selecting the first color 711 from the first color image 710.

The image forming apparatus 10 may output the reference image. The image forming apparatus 10 may scan an output reference image 720 to obtain a scanned reference image 730. The image forming apparatus 10 may receive an input of selecting the second color 731 from the scanned reference image 730. The image forming apparatus 10 may detect a color scan value 741 corresponding to the second color 731 from scan color data of a scanned color compensation chart. For example, the image forming apparatus 10 may detect (96, 62, 60), which is the color scan value 741 corresponding to the second color 731, from a scanned RGB color table 740 of the scanned color compensation chart.

The image forming apparatus 10 may map the color scan value 741 corresponding to a color value 752 to the color value 752 corresponding to the second color 731, based on a mapping relationship between a color scan value of each reference color of a color compensation chart and a color value of each reference color. For example, the image forming apparatus 10 may map (96, 62, 60), which is the color scan value 741 corresponding to the second color 731, to (104, 26, 0), which is the color value 752 corresponding to the second color 731, based on a mapping relationship between color data within the scanned RGB color table 740 of the scanned color compensation chart and color data within a digital RGB color table 750.

The image forming apparatus 10 may convert a color value 751 of the first color 711 into the color value 752 of the second color 731 and may output a first color image 760 including the second color 731 instead of the first color 711. For example, the image forming apparatus 10 may map the digital RGB value 751 of the first color 711 within the digital RGB color table 750 to the digital RGB value 752 of the second color 731, thereby outputting the first color image 710 as the first color image 760 having the second color 731 instead of the first color 711. Referring to FIG. 7, a second color 761 within the output first color image 760 may have the same saturation, brightness, hue, and the like as those of the second color 731 within the output reference image 720.

FIG. 8 is a conceptual view for explaining a process in which an image forming apparatus registers a color desired by a user in a color list and operates based on the color list, according to an example.

Referring to FIG. 8, the image forming apparatus 10 may register at least one user color in a color list, based on a user input. A UI device of the image forming apparatus 10 may register a certain color desired by a user in a "My color list", and display a screen image for setting whether to activate an operation of changing the certain color as illustrated in an image 810.

For example, the image forming apparatus 10 may register a second color as a user color, based on a user input received via the UI device, and activate a color changing operation to change a first color to the second color. As the image forming apparatus 10 activates the color changing operation to change the first color to the second color, the image forming apparatus 10 may change the first color within an image to the second color and output an image including the second color instead of the first color.

As another example, the image forming apparatus 10 may register a fourth color as a user color, based on a user input received via the UI device, and deactivate a color changing operation to change a third color to the fourth color. Thereafter, based on a user input, the image forming apparatus 10 may activate the color changing operation to change the third color to the fourth color.

Referring to an image 820, the image forming apparatus 10 may receive a request to output a third color image 821. In the image forming apparatus 10, the color changing operation to change the first color to the second color has been activated. The image forming apparatus 10 may determine whether the third color image 821 includes the first color. When the third color image 821 includes the first color, the image forming apparatus 10 may change the first color within the third color image 821 to the second color to output a third color image 822.

FIG. 9 is a conceptual view for explaining a process in which an image forming apparatus maps a certain logo to a color of the certain logo, registers a result of the mapping in a color list, and operates based on the color list, according to an example.

Referring to FIG. 9, the image forming apparatus 10 may register a certain logo shape in a color list by mapping the certain logo shape to a color of the certain logo shape, based on a user input as illustrated in an image 910. A UI device of the image forming apparatus 10 may register the certain logo shape in a "My color list" by mapping a color desired by a user to the certain logo shape, and display a screen image for setting whether to activate an operation of applying a certain color to the certain logo shape.

For example, the image forming apparatus 10 may register a second color as a color of a first logo, based on a user input received via the UI device, and activate an operation of applying the second color to the shape of the first logo. As the image forming apparatus 10 activates an operation of applying the second color to the shape of the first logo, the image forming apparatus 10 may apply the second color to the shape of the first logo within an image including the shape of the first logo and accordingly output an image to which the second color has been applied.

As another example, the image forming apparatus 10 may register a fifth color as a color of a second logo, based on a user input received via the UI device, and deactivate an operation of applying a fifth color to the shape of the second logo. Thereafter, based on a user input, the image forming apparatus 10 may activate the operation of applying the fifth color to the shape of the second logo.

Referring to an image 920, the image forming apparatus 10 may receive a request to output a third color image 921. In the image forming apparatus 10, the operation of applying the second color to the shape of the first logo has been activated. The image forming apparatus 10 may determine whether the third color image 921 includes a first shape that is the same as the shape of the first logo. When the third color image 921 includes the first shape that is the same as the shape of the first logo, the image forming apparatus 10 may apply the second color to the shape of the first logo and may output a third color image 922.

FIG. 10 is a flowchart of a method, performed by an image forming apparatus when characteristics thereof have been changed, of re-obtaining a mapping relationship between a scan color domain of a color compensation chart and a color domain of the color compensation chart and updating a color list, according to an example.

Referring to FIG. 10, the image forming apparatus 10 may determine whether characteristics thereof have been changed in operation 1010. The characteristics of the image forming apparatus 10 may be determined by at least one of a manufacturing company of the image forming apparatus 10, at least one component that is used according to a certain operation in the image forming apparatus 10, and toner that is used in the image forming apparatus 10. Accordingly, when at least one of a component or toner is replaced within the image forming apparatus 10, the characteristics of the image forming apparatus 10 may be changed. The image forming apparatus 10 may monitor whether characteristics thereof have been changed, at intervals of a certain time period. When it is determined that the characteristics of the image forming apparatus 10 have been changed, the image forming apparatus 10 may operate according to operation 1020.

In operation 1020, the image forming apparatus 10 may re-obtain a mapping relationship between a color scan value of each of at least one reference color within scan color data of a color compensation chart and a color value of each of the at least one reference color. The image forming apparatus 10 may update the re-obtained mapping relationship.

When the characteristics of the image forming apparatus 10 are changed, the color scan value of each of at least one reference color within the scan color data of the color compensation chart may be changed. Accordingly, the image forming apparatus 10 may scan the color compensation chart again and obtain a scanned color compensation chart. The image forming apparatus 10 may re-obtain a mapping relationship between a color scan value of each of the at least one reference color within the re-scanned color compensation chart and the color value of each of the at least one reference color within the color compensation chart.

In operation 1030, based on the updated mapping relationship, the image forming apparatus 10 may update the color value of the at least one user color within the color list that sets the at least one user color.

FIG. 11 is a block diagram of an image forming apparatus, according to an example.

Referring to FIG. 11, the image forming apparatus 10 may include a communication device 1110, the UI device 1120, a scanner 1130, a memory 1140, and a processor 1150. However, all of the illustrated components are not essential. The image forming apparatus 10 may be implemented by more or fewer components than those illustrated in FIG. 11. Examples of the aforementioned components will now be described.

The communication device 1110 may perform communication with an external apparatus. For example, the communication device 1110 may be connected to a network by wire or wirelessly and perform communication with an external apparatus. The external apparatus may be, but is not limited to, a server, a smartphone, a tablet, a personal computer (PC), a home appliance, a medical apparatus, a camera, a wearable device, or the like.

The communication device 1110 may include a communication module (e.g., transceiver) that supports one of various wired/wireless communication methods. For example, the communication module may be in the form of a chipset, or may be a sticker/barcode (e.g., a sticker including a near field communication (NFC) tag) including information necessary for communication. The communication module may be, but is not limited to, a short-range communication module or a wired communication module.

The communication device 1110 may support at least one of, for example, a wireless local area network (LAN), wireless fidelity (WiFi), WiFi Direct, Bluetooth, a universal serial bus (USB), a wired LAN, NFC, and the like.

The UI device 1120 may include an input unit for receiving an input or the like for performing an image forming operation from a user, and an output unit for displaying information, such as a result of performing an image forming operation or a status of the image forming apparatus 10.

For example, the UI device 1120 may include a manipulation panel that receives a user input, and a display panel that displays a screen image.

As an example, the input unit may include at least one device capable of receiving various types of user inputs, such as a keyboard, a physical button, a touch screen, a camera, a microphone, and the like. The output unit may include, for example, a display panel, a speaker, and the like. However, examples are not limited thereto, and the UI device 1120 may include at least one device that supports various inputs and outputs.

The scanner 1130 may irradiate light onto paper and receive light reflected from the paper to read an image recorded on the paper. The scanner 1130 may employ a charge-coupled device (CCD), a contact type image sensor (CIS), or the like, as an image sensor for reading an image from paper. The scanner 1130 may have a flatbed structure in which paper is located at a fixed location and an image sensor moves to read an image, a document feed structure in which an image sensor is located at a fixed location and paper is transferred, or a combination structure thereof.

The image forming apparatus 10 may further include a printing unit (not shown) and a faxing unit (not shown). The printing unit may form an image on a recording medium via any one of various printing methods, such as an electrophotography method, an inkjet method, a thermal transfer method, and a thermal method. The faxing unit may share a component for scanning an image with the scanner 1130, share a component for printing a received file with the printing unit, and the like. The faxing unit may transmit a scanned file to a destination or receive a file from an external source.

The memory 1140 may store programs, data, or files related to the image forming apparatus 10. The processor 1150 may execute the programs stored in the memory 1140, read the data or the files from the memory 1140, or store a new file in the memory 1140. The memory 1140 may store program commands, data files, data structures, and the like separately or in combinations. The memory 1140 may store instructions executable by the processor 1150.

For example, the memory 1140 may store instructions for receiving an input of selecting a first color from a first color image, instructions for scanning, via the scanner 1130 of the image forming apparatus 10, a reference image including at least one reference color for use in reproducing a color, instructions for receiving an input of selecting a second color from among the at least one reference color within the scanned reference image, instructions for determining, based on scan color data in which characteristics of the image forming apparatus 10 obtained by scanning a color compensation chart representing a color space are reflected, a second color scan value of the second color as a second color value of the second color from which the characteristics of the image forming apparatus 10 have been removed, and instructions for converting a first color value of the first color to the second color value of the second color and outputting a first color image including the second color instead of the first color.

The processor 1150 may control an operation of the image forming apparatus 10, and may include at least one processor, such as a central processing unit (CPU). The processor 1150 may control the other components included in the image forming apparatus 10 to perform an operation corresponding to a user input received via the UI device 1120. The processor 1150 may include at least one specialized processor corresponding to each function, or may be an integrated processor.

The processor 1150 may control the scanner 1130 to scan the reference image including the at least one reference color that is used to reproduce a color.

The processor 1150 may receive an input of selecting a second color from among the at least one reference color within the scanned reference image, via the UI device 1120.

Based on the scan color data in which the characteristics of the image forming apparatus 10 obtained by scanning the color compensation chart representing a color space have been reflected, the processor 1150 may determine a second color scan value of the second color as a second color value of the second color from which the characteristics of the image forming apparatus 10 have been removed.

The characteristics of the image forming apparatus 10 may be determined by at least one of a manufacturing company of the image forming apparatus 10, at least one component that is used according to a certain operation in the image forming apparatus 10, and toner that is used in the image forming apparatus 10.

The processor 1150 may determine the second color scan value as the second color value, based on a mapping relationship between a color scan value of each of the at least one reference color within the scan color data of the color compensation chart and a color value of each of the at least one reference color within color data of the color compensation chart.

The processor 1150 may obtain the mapping relationship between the color scan value of each of the at least one reference color within the scan color data of the color compensation chart and the color value of each of the at least one reference color, based on the scan color data of the color compensation chart.

For example, the processor 1150 may output a color compensation chart including a color value of each of at least one reference color sampled within a color space. The scanner 1130 may scan the output color compensation chart.

The processor 1150 may obtain at least one coefficient that is used to estimate the color scan value of each of the at least one reference color within the scan color data of the color compensation chart as the color value of each of the at least one reference color within the color data of the color compensation chart. The memory 1140 may store at least one of the scan color data of the color compensation chart, the color data of the color compensation chart, and a coefficient that maps the scan color data to the color data.

Based on the at least one coefficient, the processor 1150 may estimate the mapping relationship between the color scan value of each of the at least one reference color and the color value of each of the at least one reference color.

The processor 1150 may obtain a mapping relationship between a color scan value of each of at least one reference color having a color value belonging to a preset range from the second color value of the second color and a color value of each of the at least one reference color.

The processor 1150 may convert a first color value of the first color into the second color value of the second color and thus output the first color image having the second color instead of the first color.

Based on a user input received via the UI device 1120, the processor 1150 may register the second color as a replacement for the first color, in a color list setting at least one user color. Based on a user input, the processor 1150 may set whether to activate a color changing operation to change the first color to the second color. The processor 1150 may output a certain image for which the image forming apparatus 10 is requested, according to whether the color changing operation is activated.

The processor 1150 may receive a request to output a third color image. When the color changing operation to change the first color to the second color has been activated, the processor 1150 may determine whether the first color exists within the third color image. When the first color exists within the third color image, the processor 1150 may change the first color to the second color to output a third color image having the second color.

Based on a user input received via the UI device 1120, the processor 1150 may register the shape of the first logo in the color list setting at least one user color, by mapping the shape of the first logo to the color of the first logo. The processor 1150 may receive a request to output a third color image. The processor 1150 may determine whether the third color image includes a first shape that is the same as the shape of the first logo. When the third color image includes the first shape that is the same as the shape of the first logo, the processor 1150 may apply the color of the first logo to the first shape included in the third color image and may output a third color image.

When a first component that is used in a certain image forming operation is replaced within the image forming apparatus 10, the processor 1150 may re-obtain the mapping relationship between the color scan value of each of the at least one reference color within the scan color data of the color compensation chart and the color value of each of the at least one reference color, and may update the mapping relationship. Based on the updated mapping relationship, the processor 1150 may update the color value of the at least one user color within the color list that sets the at least one user color.

The above-described methods of operating the image forming apparatus 10 may be embodied in form of a non-transitory computer-readable recording medium storing computer-executable instructions or data. The above-described examples can be written as computer programs and can be implemented in general-use digital computers that execute the programs using a computer-readable recording medium. Examples of the non-transitory computer-readable recording medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk, a solid-state disk (SSD), and any device capable of storing an instruction or software, related data, a data file, and data structures and providing the instruction or software, the related data, the data file, and the data structures to a processor or a computer such that the processor or the computer execute the instruction.

While the disclosure has been particularly shown and described with reference to examples thereof, it will be understood by those of ordinary skill in the art that various changes in form and details may be made therein without departing from the spirit and scope of the disclosure as defined by the following claims. For example, an appropriate result may be attained even when the above-described techniques are performed in a different order from the above-described method, and/or components, such as the above-described system, structure, device, and circuit, are coupled or combined in a different form from the above-described methods or substituted for or replaced by other components or equivalents thereof.

Therefore, the scope of the present disclosure is defined not by the description of examples but by the appended claims and equivalents to the appended claims.

The invention claimed is:

1. A method performed by an image forming apparatus, the method comprising:
receiving an input of selecting a first color from a first color image;
scanning, by a scanner of the image forming apparatus, a reference image including at least one reference color that is used to reproduce a color;
receiving an input of selecting a second color from the at least one reference color within the scanned reference image;
based on scan color data in which characteristics of the image forming apparatus obtained by scanning a color compensation chart representing a color space have been reflected, determining a second color scan value of the second color as a second color value of the second color from which the characteristics of the image forming apparatus have been removed; and
converting a first color value of the first color into the second color value of the second color and outputting the first color image having the second color instead of the first color.

2. The method of claim 1, wherein the determining of the second color scan value as the second color value, based on the scan color data in which the characteristics of the image forming apparatus have been reflected comprises determining the second color scan value as the second color value, based on a mapping relationship between a color scan value of each of at least one reference color within scan color data of the color compensation chart and a color value of each of the at least one reference color within color data of the color compensation chart.

3. The method of claim 1, further comprising obtaining a mapping relationship between a color scan value of each of at least one reference color within scan color data of the color compensation chart and a color value of each of the at least one reference color, based on the scan color data of the color compensation chart.

4. The method of claim 3, wherein the obtaining of the mapping relationship comprises:
outputting the color compensation chart including the color value of each of the at least one reference color sampled within the color space;
scanning, by the scanner, the output color compensation chart;
obtaining at least one coefficient that is used to estimate the color scan value of each of the at least one reference color within the scan color data of the color compensation chart as the color value of each of the at least one reference color within the color data of the color compensation chart; and
based on the at least one coefficient, estimating the mapping relationship between the color scan value of each of the at least one reference color and the color value of each of the at least one reference color.

5. The method of claim 3, wherein the obtaining of the mapping relationship comprises obtaining a mapping relationship between the color scan value of each of the at least one reference color having a color value belonging to a preset range from the second color value of the second color and the color value of each of the at least one reference color.

6. The method of claim 1, further comprising:
registering the second color as a replacement color for the first color in a color list that sets at least one user color;
setting whether to activate a color changing operation to change the first color to the second color; and
outputting a certain image for which the image forming apparatus is requested, according to whether the color changing operation is set to activate.

7. The method of claim 6, wherein the outputting of the certain image for which the image forming apparatus is requested, according to whether the color changing operation is set to activate, comprises:
receiving a request to output a third color image;
when the color changing operation to change the first color to the second color has been activated, determining whether the first color exists within the third color image; and
when the first color exists within the third color image, changing the first color to the second color and outputting the third color image having the second color instead of the first color.

8. The method of claim 1, further comprising:
registering a shape of a first logo in a color list that sets at least one user color, by mapping the shape of the first logo to a color of the first logo;
receiving a request to output a third color image;
determining whether the third color image includes a first shape that is the same as the shape of the first logo; and
when the first shape that is the same as the shape of the first logo is included in the third color image, applying the color of the first logo to the first shape and outputting the third color image.

9. The method of claim 1, wherein the characteristics of the image forming apparatus are determined according to at least one of a manufacturing company of the image forming apparatus, at least one component that is used according to a certain operation in the image forming apparatus, and toner that is used in the image forming apparatus.

10. The method of claim 3, further comprising:
when a first component that is used in a certain image forming operation is replaced within the image forming apparatus, re-obtaining the mapping relationship between the color scan value of each of the at least one reference color within the scan color data of the color compensation chart and the color value of each of the at least one reference color, and updating the mapping relationship; and
based on the updated mapping relationship, updating a color value of at least one user color included in a color list that sets the at least one user color.

11. A non-transitory computer-readable storage medium having stored thereon instructions executable by a processor, the computer-readable storage medium comprising:
instructions to receive an input of selecting a first color from a first color image;
instructions to scan, by a scanner of an image forming apparatus, a reference image including at least one reference color that is used to reproduce a color;
instructions to receive an input of selecting a second color from the at least one reference color within the scanned reference image;
instructions to, based on scan color data in which characteristics of the image forming apparatus obtained by scanning a color compensation chart representing a color space have been reflected, determine a second color scan value of the second color as a second color value of the second color from which the characteristics of the image forming apparatus have been removed; and instructions to convert a first color value of the first color into the second color value of the second color and outputting the first color image having the second color instead of the first color.

12. An image forming apparatus comprising:
   a communication device to communicate with an external apparatus;
   a user interface device;
   a scanner;
   a processor; and
   a memory to store instructions executable by the processor, wherein the processor executes the instructions to:
   receive an input of selecting a first color from a first color image, via the user interface device;
   scan, by the scanner, a reference image including at least one reference color that is used to reproduce a color;
   receive an input of selecting a second color from the at least one reference color within the scanned reference image, via the user interface device;
   based on scan color data in which characteristics of the image forming apparatus obtained by scanning a color compensation chart representing a color space have been reflected, determine a second color scan value of the second color as a second color value of the second color from which the characteristics of the image forming apparatus have been removed; and
   convert a first color value of the first color into the second color value of the second color and output the first color image having the second color instead of the first color.

13. The image forming apparatus of claim 12, wherein the memory stores further instructions that are executed by the processor to determine the second color scan value as the second color value, based on a mapping relationship between a color scan value of each of at least one reference color within scan color data of the color compensation chart and a color value of each of the at least one reference color within color data of the color compensation chart.

14. The image forming apparatus of claim 12, wherein the memory stores further instructions that are executed by the processor to:
   output the color compensation chart including a color value of each of the at least one reference color sampled within the color space;
   scan the output color compensation chart via the scanner;
   obtain at least one coefficient that is used to estimate the color scan value of each of the at least one reference color within the scan color data of the color compensation chart as the color value of each of the at least one reference color within the color data of the color compensation chart; and
   based on the at least one coefficient, estimate a mapping relationship between the color scan value of each of the at least one reference color and the color value of each of the at least one reference color.

15. The image forming apparatus of claim 12, wherein the memory stores further instructions that are executed by the processor to:
   register the second color as a replacement color for the first color in a color list that sets at least one user color, via the user interface device;
   set whether to activate a color changing operation to change the first color to the second color, via the user interface device; and
   output a certain image for which the image forming apparatus is requested, according to whether the color changing operation is set to activate.

\* \* \* \* \*